(12) United States Patent
Halder et al.

(10) Patent No.: US 8,942,863 B2
(45) Date of Patent: Jan. 27, 2015

(54) WORKSITE POSITION CONTROL SYSTEM HAVING INTEGRITY CHECKING

(71) Applicant: Caterpillar Inc., Peoria, IL (US)

(72) Inventors: Bibhradjit Halder, Peoria, IL (US); Andrew Thomas Whitten, Dunlap, IL (US); Aaron Michael Donnelli, Metamora, IL (US); Eric Moughler, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/677,913

(22) Filed: Nov. 15, 2012

(65) Prior Publication Data

US 2014/0136020 A1 May 15, 2014

(51) Int. Cl.
*E02F 5/02* (2006.01)
*G06F 17/00* (2006.01)
*B60Q 1/00* (2006.01)

(52) U.S. Cl.
CPC . *G06F 17/00* (2013.01); *B60Q 1/00* (2013.01)
USPC .................................................. 701/2; 37/348

(58) Field of Classification Search
CPC .............. B60Q 1/00; E02F 5/02; G06F 17/00
USPC .................................................. 701/2; 37/348
See application file for complete search history.

(56) References Cited

U.S. PATENT DOCUMENTS

| 5,359,521 | A | 10/1994 | Kyrtsos et al. |
| 5,612,864 | A | 3/1997 | Henderson |
| 5,646,844 | A | 7/1997 | Gudat et al. |
| 5,925,085 | A | 7/1999 | Kleimenhagen et al. |
| 5,951,613 | A | 9/1999 | Sahm et al. |
| 6,068,060 | A | 5/2000 | Ohtomo et al. |
| 6,191,733 | B1 | 2/2001 | Dizchavez |
| 6,339,745 | B1 | 1/2002 | Novik |
| 6,345,231 | B2 | 2/2002 | Quincke |
| 6,711,838 | B2 * | 3/2004 | Staub et al. ...................... 37/348 |
| 7,640,683 | B2 | 1/2010 | McCain |
| 7,831,362 | B2 | 11/2010 | Ishibashi et al. |
| 2007/0198145 | A1 * | 8/2007 | Norris et al. .................... 701/23 |
| 2008/0147282 | A1 | 6/2008 | Kormann |
| 2010/0070125 | A1 * | 3/2010 | Lee et al. ........................ 701/28 |

* cited by examiner

*Primary Examiner* — Mary Cheung
*Assistant Examiner* — Yuen Wong
(74) *Attorney, Agent, or Firm* — Finnegan, Henderson, Farabow, Garrett & Dunner LLP

(57) ABSTRACT

A position control system for use with a mobile machine at a worksite is disclosed. The control system may have a location receiver configured to generate a location signal indicative of an actual location of a base station, a communication device configured to wirelessly communicate with the mobile machine, and a controller in communication with the location receiver and the communication device. The controller may be configured to store an assumed location of the base station in memory, make a comparison of the location signal with the assumed location, and selectively generate a control instruction for the mobile machine based on the comparison.

18 Claims, 3 Drawing Sheets

WORKSITE POSITION CONTROL SYSTEM HAVING INTEGRITY CHECKING

TECHNICAL FIELD

The present disclosure relates generally to a control system for a worksite, and more particularly, to a worksite position control system having integrity checking.

BACKGROUND

Worksites, for example, mine sites, landfills, quarries, construction sites, etc., commonly undergo geographic alteration by machines performing various tasks thereon. For example, at a coal mining site, mounds of coal are continually moved by dozers about the site, onto conveyors, into chutes, etc., to prepare the coal for transport. Likewise, at an excavation site, terrain is altered by digging, grading, leveling, or otherwise preparing the terrain for various uses. During the performance of these tasks, the machines can operate in situations that are hazardous to an operator, under extreme environmental conditions, or at work locations remote from civilization. Accordingly, autonomous or semiautonomous machines are often utilized.

Autonomous and semiautonomous machines may be in communication with a general site controller located at a base station, and the machines may receive assigned tasks from the general site controller. The assigned tasks may depend on the location of the base station. As such, to ensure the safety of these machines, the site controller must accurately know the location of the base station.

An exemplary system that provides position monitoring is disclosed in U.S. Pat. No. 7,831,362 issued to Ishibashi et al. on Nov. 9, 2010 ("the '362 patent"). Specifically, the '362 patent discloses a machine equipped with a UPS system for measuring the location of the machine's body. Sometimes, however, the UPS measurement of the machine body's location is inaccurate. As such, the '362 patent also discloses a reference station that may correct inaccurate GPS measurements using various angle sensors, an inclination sensor, and a gyroscope located on the machine.

Although the '362 patent may account for inaccuracies in a GPS measurement of a machine, it does not address possible inaccuracies in the location of a reference station. The system also requires multiple sensors on each machine, which may be bulky and expensive. Lastly, the sensors may malfunction under harsh worksite conditions and render the '362 system unable to correct location inaccuracies.

The disclosed position control system is directed to overcoming one or more of the problems set forth above and/or other problems of the prior art.

SUMMARY

In one aspect, the present disclosure is directed to a position control system for use with a mobile machine at a worksite. The position control system may include a location receiver configured to generate a location signal indicative of an actual location of a base station at the worksite, a communication device configured to wirelessly communicate with the mobile machine, and a controller in communication with the location receiver and the communication device. The controller may be configured to store an assumed location of the base station in memory, make a comparison of the actual location with the assumed location, and selectively generate a control instruction for the mobile machine based on the comparison.

In another aspect, the present disclosure is directed to a method of monitoring a position of a base station at a worksite. The method may include receiving a location signal indicative of an actual location of the base station, making a comparison of the actual location with an assumed location of the base station, and selectively generating a control instruction for a mobile machine at the worksite based on the comparison.

In yet another aspect, the present disclosure is directed to a computer readable medium for use by a position control monitoring system. The computer readable medium may have executable instructions stored thereon for performing a method of monitoring a position of a base station. The method may include receiving a location signal indicative of an actual location of the base station, making a comparison of the actual location with an assumed location of the base station, and selectively generating a control instruction for a mobile machine at a worksite based on the comparison.

DETAILED DESCRIPTION

Figure 1:
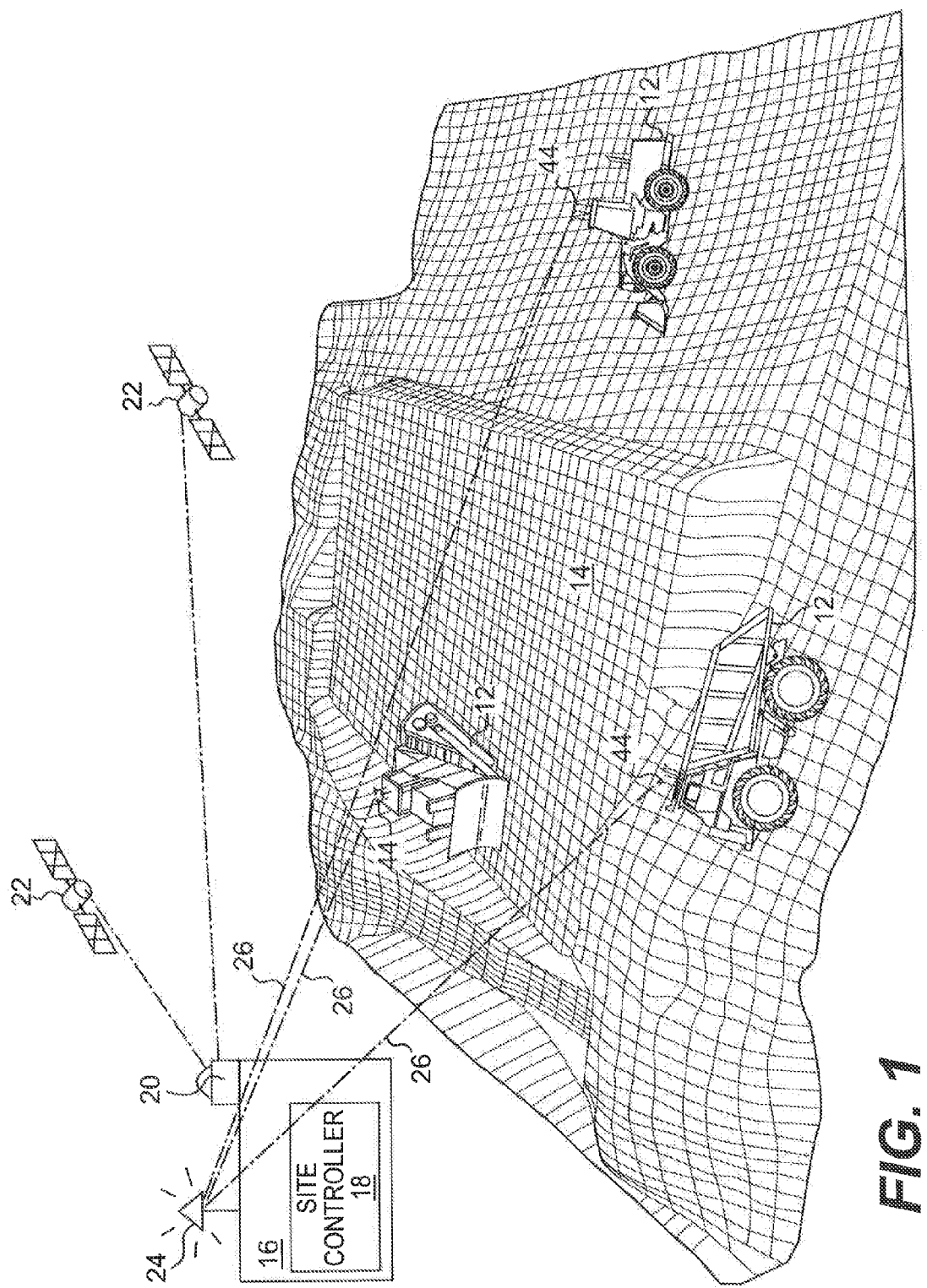
FIG. 1 is a pictorial illustration of an exemplary disclosed position control system.

FIG. 1 illustrates a worksite 10 and one or more mobile machines 12 performing tasks at the worksite 10. The worksite 10 may include, for example, a mine site, a landfill, a quarry, a construction site, or any other type of worksite 10 having a roadway or ground surface 14 traversable by the machines 12. The machines 12 may be autonomous, semi-autonomous, or manned by an operator. A base station 16 may be located at or near the worksite 10.

The base station 16 is intended to be stationary. However, the base station 16 may occasionally move during operation at the worksite 10. For example, the base station 16 may drift, be bumped, or affected by changes in ground surface 14. Additionally, the base station 16 may be moved between areas at the worksite 10 when tasks at an area have been completed (e.g., during different stages of work at the worksite 10). A change in the location of the base station 16 may be problematic, because a site controller 18 at the base station 16 may rely on knowledge of the location to generate and send control instructions 26 to the machines 12. As such, in order to safely and accurately operate the machines 12, the location of the base station 16 must be accurately known.

Initially, an assumed location of the base station 16 may be determined by surveying. For the purposes of this disclosure, the term "assumed location" is to be defined as a previously known location (for example, as determined by surveying). It is assumed that the previously known location has not changed, even though it may have been some time since the previously known location was determined. The assumed location of the base station 16 may initially be determined to centimeter accuracy, although lesser degrees of accuracy are contemplated. The assumed location of the base station 16 may occasionally be updated by re-surveying.

The integrity of the assumed location may be periodically checked by comparing the assumed location with an actual location of the base station 16 (e.g., of a critical reference point at the base station 16). This process may be known as integrity checking. To determine the actual location of the base station 16, a location receiver 20 may be provided at the base station 16. Location receiver 20 may embody a Global Positioning System (GPS) unit, an Inertial Reference/Measurement Unit (IR/MU), a local tracking system, or any other known locating receiver configured to receive or determine positional information associated with base station 16. Location receiver 20 may be in communication with one of more satellites 22, and may receive signals indicative of the actual location of the base station 16 from the satellites 22. Location receiver 20 may then periodically generate a location signal. In one embodiment, location signals are sent by location receiver 20 to the site controller 18 at a rate of about 1 signal per second. Other rates are also contemplated.

The site controller 18 may be located at, near, or within the base station 16. Site controller 18 may embody a single or multiple microprocessors, field programmable gate arrays (FPGAs), digital signal processors (DSPs), etc, that include components for affecting an operation of machine 12. Numerous commercially available microprocessors can be configured to perform the functions of site controller 18. Various other known circuits may be associated with site controller 18, including power supply circuitry, signal-conditioning circuitry, actuator driver circuitry (i.e., circuitry powering solenoids, motors, or piezo actuators), and communication circuitry. The site controller 18 may be configured to store the assumed location of the base station 16 in memory. The site controller 18 may be further configured to execute sequences of computer program instructions stored on computer readable media to perform a method of monitoring the position of the base station 16 at the worksite 10 that will be explained below.

The site controller 18 may communicate with machines 12 via a communication device 24. Communication device 24 may embody any mechanism that facilitates the exchange of data between site controller 18 and the one or more machines 12. Communication device 24 may include hardware and/or software that enables site controller 18 to send and/or receive data messages through a direct data link (not shown) or a wireless communication link. The wireless communications may include, for example, satellite, cellular, infrared, and any other type of wireless communications that enable site controller 18 to wirelessly exchange information.

Site controller 18 may be configured to send control instructions 26, via communication device 24, to the one or more machines 12 to instruct the performance of various functions. Exemplary control instructions 26 include instructing a machine 12 to go to a desired location, instructing a machine 12 to initiate certain tasks at worksite 10, or instructing a machine 12 to slow down or shut down. Exemplary tasks may be associated with altering the geography at worksite 10 and may include, for example, a hauling operation, a grading operation, a leveling operation, a plowing operation, a bulk material removal operation, or any other type of operation. The control instructions 26 may be different for manned, autonomous, or semi-autonomous machines. For example, control instructions 26 for a manned machine 12 may be provided to an operator visually or audibly by way of a display, speakers, etc. (not shown). Control instructions 26 for autonomous or semi-autonomous machines 12 may be directed to actuation of machine components (e.g., steering, braking, fueling, etc.), and cause autonomous implementation of the instructions. In any machine 12 (autonomous, semi-autonomous, or manned), the site controller 18 may be capable of activating a warning device 28. Warning device 28 may be configured to provide a warning and/or a recommendation to an onboard, offboard, or remote operator when activated.

Figure 2:
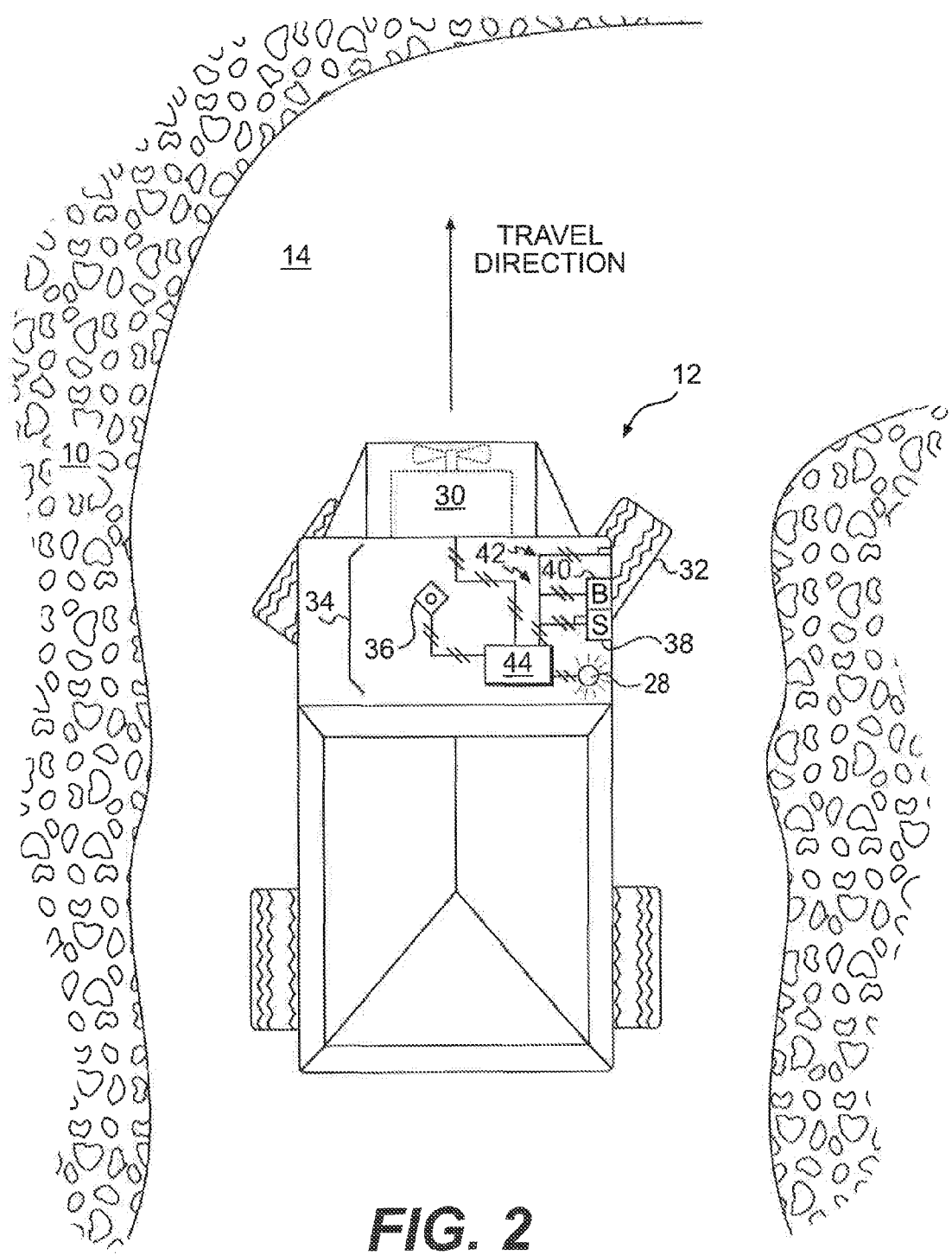
FIG. 2 is a pictorial illustration of an exemplary disclosed machine for use with the position control system of FIG. 1.

FIG. 2 depicts an exemplary machine 12 for use at worksite 10. Machine 12 may include, among other things, a power source 30, one or more traction devices 32, a navigation system 34, and an instruction receiver 36. Power source 30 may generate and provide power to traction devices 32 to propel machine 12, while navigation system 34 and instruction receiver 36 may help to regulate operation of power source 30 and/or traction devices 32. In a manned machine 12, navigation system 34 and/or instruction receiver 36 may be omitted, if desired.

Power source 30 may embody an internal combustion engine such as, for example, a diesel engine, a gasoline engine, a gaseous fuel-powered engine, or any other type of engine apparent to one skilled in the art. Power source 30 may alternatively or additionally include a non-combustion source of power such as a fuel cell, a power storage device, an electric motor, or other similar mechanism. Power source 30 may be connected to drive traction devices 32 via a direct mechanical coupling, a hydraulic circuit, an electrical circuit, or in any other suitable manner.

Traction device 32 may be a wheel, a belt, a track, or another traction device known in the art. One or more of traction devices 32 may be driven by power source 30 to rotate and propel machine 12 in accordance with an output rotation of power source 30. A steering device 38, for example a hydraulic cylinder, a hydraulic motor, an electric motor, and/or a rack-and-pinion configuration may be associated with one or more traction device 32 to affect steering thereof. In addition, a braking device 40, for example a compression disk brake, an internal fluid brake, an engine retarder, an exhaust brake, and/or a transmission brake may be associated with one or more traction device 32 and/or power source 30 to affect braking of machine 12.

Navigation system 34 may include multiple components that interact to help regulate maneuvering of machine 12. Specifically, navigation system 34 may include a navigation unit 42, and an onboard controller 44 in communication with power source 30, traction device 32, instruction receiver 36, steering device 38, and/or braking device 40. Onboard controller 44 may be configured to partially or fully control maneuvering (i.e., propulsion, steering, and/or braking) of machine 12 based on input received from navigation unit 42, from an operator of machine 12, and/or a control instruction 26 from the site controller 18. Onboard controller 44 may also be configured to partially or fully control maneuvering based on preprogrammed instructions stored in memory. Instruction location receiver 36 may be configured to receive control instructions 26 from the base station 16 (via communication device 24) and to communicate the control instructions 26 to an operator and/or onboardcontroller 44 for implementation.

Figure 3:
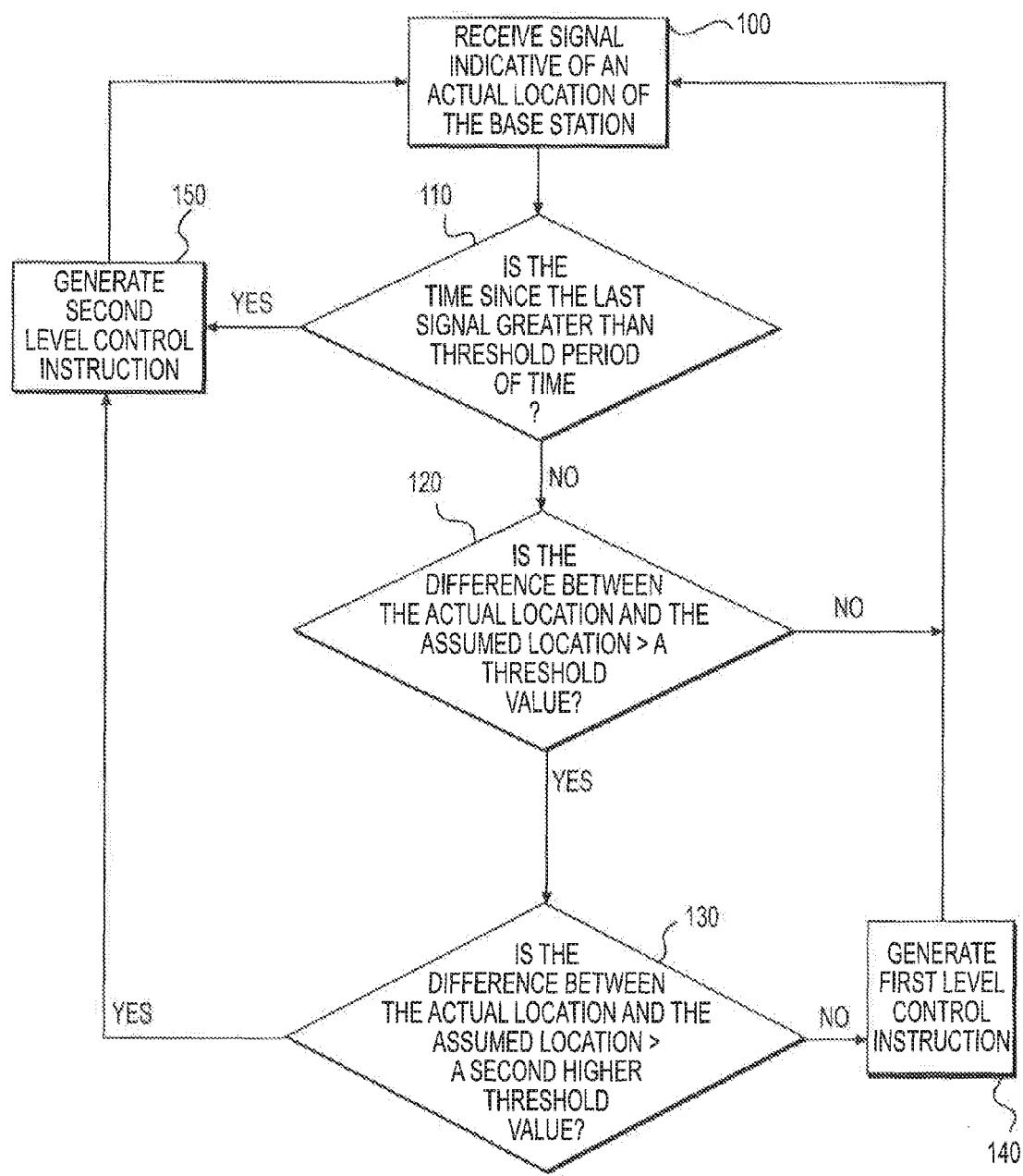
FIG. 3 is a flowchart depicting an exemplary disclosed method that may be performed by the position control system of FIG. 1.

FIG. 3 illustrates an exemplary disclosed method of monitoring a position of the base station 16, which can be stored as instructions on computer readable medium for execution by site controller 18. FIG. 3 will be discussed in more detail in the following section to further illustrate the disclosed concepts.

Industrial Applicability

The disclosed position control system may be applicable to any worksite having a base station and one or more mobile machines. The disclosed position control system may help to determine an accurate location of the base station, and to provide machine control when an assumed location of the base station is not accurate to a desired degree. The disclosed system may be used with mobile machines that are manually controlled, partially autonomous, or completely autonomous. Operation of the disclosed position control system will now be described with reference to FIG. 3.

As can be seen from FIG. 3, an exemplary method of monitoring a position of base station 16 at worksite 10 may begin by the site controller 18 receiving a signal indicative of an actual location of the base station 16 (Step 100). Location receiver 20 may receive the signal from one or more satellites 22. The signal may include two- or three-dimensional information. In accordance with the discussion above, location receiver 20 may periodically communicate the signal indicative of the actual location of the base station 16 to the site controller 18.

Since accurately knowing the location of the base station 16 at all times is important, site controller 18 may determine if the time since receipt of the last signal is greater than a threshold period of time (Step 110). In one example, the threshold period of time for Step 110 may be about 10 seconds. Other times may also be possible. If the time since receipt of the last signal is greater than the threshold period of time, the site controller 18 may generate a control instruction 26 (Step 150). Specifically, site controller 18 may generate a second level control instruction 26. Second level control instructions 26 may differ depending on whether they are sent to manned or autonomous machines 12. For example, second level control instructions 26 for a manned machine 12 may include instructing an operator to navigate the machine 12 to a known safe location, instructing an operator to shut down the machine 12, and/or instructing an operator to slow down the machine 12. Second level control instructions 26 for an autonomous or semiautonomous vehicle may include instructing the machine 12 (via control instruction location receiver 36 and navigation system 34) to go to a known safe location, slow down the machine 12, or shut down the machine 12. Regardless of whether the machines 12 are autonomous, semi-autonomous, or manned, site controller 18 may generate one or more second level control instructions 26 for a single machine 12 at the worksite 10, or may simultaneously generate a plurality of second level control instructions 26 for some or all of the machines 12 at a worksite 10. For example, the site controller 18 may issue a "site wide stop" by simultaneously generating second level control instructions 26 for all machines 12 at worksite 10.

If the time since receipt of the last signal is not greater than the threshold period of time, the site controller 18 may determine a difference between the actual location (as indicated by the last signal from location receiver 20) and the assumed location of the base station 16 (Step 120). Step 120 may be known as integrity checking. As discussed above, the assumed location of the base station 16 may be determined to a desired accuracy by surveying. Alternatively or additionally, an assumed location of the base station 16 may be determined by a signal indicative of the actual location of the base station 16 from a previous cycle of the process of FIG. 3 (as received from location receiver 20). If the site controller 18 determines that the difference between the assumed location and the actual location is not greater than a threshold value in Step 120, then the site controller 18 may return to receiving signals indicative of the actual location of the base station 16 (Step 100).

If the site controller 18 determines that the difference is greater than the threshold value in Step 120, then the site controller 18 may decide if the difference is greater than a second higher threshold value (Step 130). In one example, the threshold value is between about 0.10 m and 0.20 m, and the second higher threshold value is between about 4.00 m and 6.00 m. Further, the threshold value and second higher threshold value may be programmable to any value by any way known in the art.

If the site controller 18 decides that the difference is greater than the second higher threshold value in Step 130, then the site controller 18 may trigger the base station 16 to generate a control instruction 26 (Step 150). Specifically, the site controller 18 may generate and send (via communication device 24) a second level control instruction 26 to one or more machines 12.

If site controller 18 determines that the difference is not greater than the second higher threshold value in Step 130, then the site controller 18 may instead generate a first level control instruction 26 (Step 140). For example, a first level control instruction 26 may cause activation of warning device 28. When activated by the site controller 18, warning device 28 may provide a warning and/or a recommendation to a site operator, an onboard operator, and/or offboard personnel at the worksite 10 of machine 12. The warning and recommendation may be audible, visual, or a combination of both audible and visual stimulation. The warning may be produced at the base station 16, inside and/or outside one of more of the machines 12, or both.

By employing the disclosed position control system, possible inaccuracies in the location of a reference station are addressed. Further, the position control system should be relatively inexpensive to employ because it has relatively few components. Additionally, the position control system should operate effectively in harsh worksite conditions because the components may be protected inside of the reference station.

It will be apparent to those skilled in the art that various modifications and variations can be made to the position control system of the present disclosure. Other embodiments of the position control system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A position control system for use with a mobile machine at a worksite, comprising:
    a location receiver configured to generate a location signal indicative of an actual location of a base station at the worksite;
    a communication device configured to wirelessly communicate with the mobile machine; and
    a controller in communication with the location receiver and the communication device, the controller being configured to:
        store a previously known location of the base station in memory;
        make a comparison of the actual location with the previously known location; and
        selectively generate a control instruction for the mobile machine based on the comparison, wherein the control instruction causes activation of a warning device when the comparison indicates a difference between the previously known and actual locations greater than a threshold value.

2. The system of claim 1, wherein the threshold value is between about 0.10 m and 0.20 m.

3. The system of claim 1, wherein the control instruction includes instructions for adjusting operation of the mobile machine when the comparison indicates the difference between the previously known and actual locations is greater than a second higher threshold value.

4. The system of claim 3, wherein the second higher threshold value is about between 4 m and 6 m.

5. The system of claim 4, wherein at least one of the threshold value and the second higher threshold value is programmable.

6. The system of claim 3, wherein adjusting operation of the mobile machine includes shutting down the mobile machine.

7. The system of claim 3, wherein adjusting operation of the mobile machine includes slowing the mobile machine.

8. The system of claim 3, wherein adjusting operation of the mobile machine includes maneuvering the mobile machine to a known safe location.

9. The system of claim 3, wherein the control instruction is provided to an operator visually and/or audibly.

10. The system of claim 3, wherein the control instruction is executed autonomously.

11. The system of claim 1, wherein the controller is further configured to simultaneously generate control instructions for multiple mobile machines.

12. The system of claim 1, wherein the controller is further configured to generate the control instruction when the location signal is not received by the location receiver within a threshold period of time.

13. The system of claim 1, wherein the controller is further configured to generate the control instruction when the comparison indicates a difference between the previously known and actual locations greater than a threshold value.

14. A method of monitoring a position of a base station at a worksite, the method comprising:
   receiving a location signal indicative of an actual location of the base station;
   making, by a controller, a comparison of the actual location with a previously known location of the base station; and
   selectively generating, by the controller, a control instruction for a mobile machine at the worksite based on the comparison, wherein the control instruction causes activation of a warning device when the comparison indicates a difference between the previously known and actual locations is greater than a first threshold value.

15. The method of claim 14, wherein the control instruction includes instructions for adjusting operation of the mobile machine.

16. The method of claim 15, wherein the adjusting operation includes one or more of shutting down the mobile machine, slowing down the mobile machine, and instructing the mobile machine to go to a known safe location.

17. The method of claim 14, wherein selectively generating includes simultaneously generating control instructions for multiple mobile machines.

18. A non-transitory computer readable medium for use by a position control system, the computer readable medium having executable instructions stored thereon for performing a method of monitoring a position of a base station, the method comprising:
   receiving a location signal indicative of an actual location of the base station;
   making a comparison of the actual location with a previously known location of the base station; and
   selectively generating a control instruction for a mobile machine at a
   worksite based on the comparison, wherein the control instruction causes activation of a warning device when the comparison indicates a difference between the previously known and actual locations is greater than a first threshold value.

* * * * *

UNITED STATES PATENT AND TRADEMARK OFFICE
CERTIFICATE OF CORRECTION

| | | |
|---|---|---|
| PATENT NO. | : 8,942,863 B2 | Page 1 of 1 |
| APPLICATION NO. | : 13/677913 | |
| DATED | : January 27, 2015 | |
| INVENTOR(S) | : Halder et al. | |

It is certified that error appears in the above-identified patent and that said Letters Patent is hereby corrected as shown below:

In the specification

Column 1, line 35, delete "UPS" and insert -- GPS --.

Column 1, line 37, delete "UPS" and insert -- GPS --.

Column 3, line 20, delete "etc," and insert -- etc. --.

Column 4, line 60, delete "Industrial Applicability" and insert -- INDUSTRIAL APPLICABILITY --.

Signed and Sealed this
Seventeenth Day of November, 2015

Michelle K. Lee
*Director of the United States Patent and Trademark Office*